UNITED STATES PATENT OFFICE.

PAUL JACOBSON AND HERMANN TIGGES, OF BERLIN, GERMANY, ASSIGNORS TO LEOPOLD CASSELLA & CO., OF FRANKFORT-ON-THE-MAIN, GERMANY.

OXYDIAMIDODIPHENYL AND PROCESS OF MAKING SAME.

SPECIFICATION forming part of Letters Patent No. 604,049, dated May 17, 1898.

Application filed November 13, 1897. Serial No. 658,443. (No specimens.) Patented in Germany July 12, 1896, No. 90,960, and in France August 7, 1896, No. 258,735.

*To all whom it may concern:*

Be it known that we, PAUL JACOBSON and HERMANN TIGGES, citizens of Prussia, and residents of Berlin, Germany, have invented new and useful Improvements in the Production of Diamidoöxydiphenyl Bases, of which the following is a specification.

This invention (for which patents have been obtained in Germany, No. 90,960, dated July 12, 1896, and in France, No. 258,735, dated August 7, 1896) relates to the production of diamidoöxydiphenyl bases.

It is well known that oxyazobenzene reduced in acid solution is almost completely split into anilin and paraämidophenol. From the researches of P. Jacobson (*Berl. Berichte* 25, p. 992, 26, pp. 681, 688, 699; *Annalen* 287, p. 97) it is further known that the alkyl ethers of oxyazobenzene are transformed by the same treatment into semidins—derivatives of the ortho—viz., paraämidodiphenylamin.

We have now found that the acid esters of oxyazobenzene behave in a materially different manner, being transformed into oxydiamidodiphenyl bases by reducing agents—for instance, from acetyl oxyazobenzene a base isomeric to oxyhydrazobenzene is obtained, which acccording to its reactions must be considered as oxydiamidodiphenyl

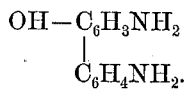

Example: Ten grams acetyl oxyazobenzene (Wallach & Kiepenheuer, *Berl. Berichte* 14, p. 2617) are finely ground and gradually introduced into sixty cubic centimeters of a solution containing forty grams chlorid of tin dissolved in one hundred cubic centimeters muriatic acid of thirty-eight per cent. under continuous stirring. The temperature of the liquor is raised thereby and care has to be taken that by cooling with cold water the temperature does not exceed 40° centigrade. After standing about a day a large quantity of double salts of tin separates from the solution, consisting chiefly of oxydiamidodiphenyl and of a small quantity of benzidin. By strong pressing any muriatic acid adhering is as far as possible removed from it. This double salt is then dissolved in about twenty parts of water, the tin is precipitated with sulfureted hydrogen, and the solution from which the tin has been filtered off is strongly evaporated in a stream of carbonic acid. By adding diluted sulfuric acid the benzidin is separated in form of its difficultly-soluble sulfate. After having ascertained that sulfuric acid does no more cause a precipitate from the solution the benzidin sulfate is filtered off, the solution is partially neutralized with caustic soda, and then completely with a concentrated solution of carbonate of soda. Thereby the oxydiamidodiphenyl separates partly as a white crystalline, partly as a resinous precipitate. It can be purified by crystallization from water or benzene.

Oxydiamidodiphenyl melts at 148° centigrade. It is easily soluble in alcohol, glacial acetic acid, and hot water; more difficultly soluble in benzene. From hot water it crystallizes on cooling in fascicular needles. It is soluble in soda-lye. The alkaline solution turns dark brown on standing in open vessels.

That the base is a primary diamin has been proved by investigating its derivatives, when it was found that only one molecule of the base condenses with two molecules of aldehyde and takes up two acetyl groups on being acetylated with boiling glacial acetic acid.

The salicylaldehyde derivative

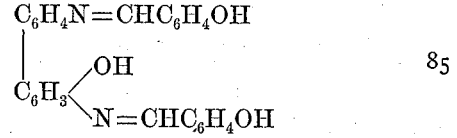

forms yellowish-brown leaflets of a golden luster, melting at 206° to 207° centigrade.

The paranitrobenzaldehyde derivative

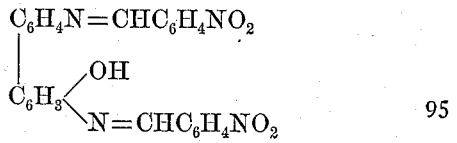

forms an orange-red flaky powder, which melts at 218° centigrade.

The diacetyl derivative

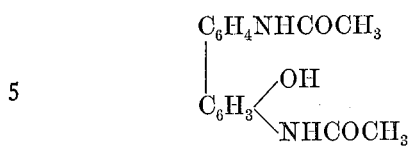

melts at 269° centigrade.

The position of the substituents in this oxydiamidodiphenyl may probably be demonstrated by the following formula:

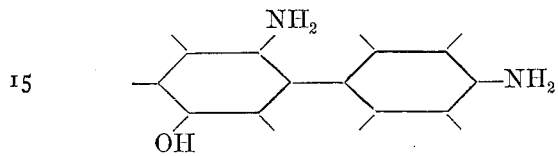

The oxydiamidodiphenyl can be used to advantage for producing dyestuffs as well as a photographic developer.

Instead of transforming acetyl oxyazobenzene directly by reduction in mineral-acid solution into oxydiamidodiphenyl, also acetyl oxyhydrazobenzene may be first produced therefrom (Goldschmidt & Brubacher, Berichte 24, p. 2309) and transform the latter by treating with acids into oxydiamidodiphenyl. Analogous to the acetyl oxyazobenzene and acetyl oxyhydrazobenzene behave the acetyl derivatives of other paraoxyazo compounds which are not substituted in one of the groups para to the azo group, as well as the corresponding hydrazo compounds. The reaction takes place in another way by starting from double substituted paraäzo bodies—such as, for instance, the acetylated product from diazotized paratoluidin and phenol. Goldschmidt & Brubacher have made experiments in this direction, (see Berichte 24, p. 2311;) but their indications could not be confirmed, the reduction yielding the two normal semidins, the orthosemidin of the melting-point 136° centigrade characterized by the formation of an azimid melting at 188° centigrade by the reaction of nitrous acid, and the parasemidin melting at 118° to 119° centigrade, which was found to be identical with the paraämidophenyl paratolylamin produced by Reichold (Annalen 255, pp. 166 to 167.)

Having now described and ascertained our invention and in what manner the same is to be carried out, what we claim as new, and desire to secure by Letters Patent, is—

1. The process of producing oxydiamidodiphenyl bases by reducing the acetyl derivatives of oxyazo compounds such as paraoxyazobenzene by means of chlorid of tin and muriatic acid substantially as described.

2. The oxydiamidodiphenyl having the constitution $OH.NH_2-C_6H_3-C_6H_4NH_2$ which is a colorless substance melting at 148° centigrade easily soluble in alcohol, glacial acetic acid and hot water, more difficultly soluble in benzene, soluble in soda-lye being easily oxidized in alkaline solution substantially as described.

In testimony that we claim the foregoing as our invention we have signed our names, in presence of two witnesses, this 30th day of October, 1897.

PAUL JACOBSON.
HERMANN TIGGES.

Witnesses:
WALDEMAR HAUPT,
HENRY HASPER.